US008169368B2

(12) United States Patent
Lorgeoux et al.

(10) Patent No.: US 8,169,368 B2
(45) Date of Patent: May 1, 2012

(54) METHOD, APPARATUS AND COMPUTER PROGRAM FOR UPDATING ANTENNA BEAM ANGLES OF A DIRECTIONAL ANTENNA OF WIRELESS DEVICE

(75) Inventors: Mickaël Lorgeoux, Rennes (FR); Francois Thoumy, Vignoc (FR)

(73) Assignee: Canon Kabushiki Kaisha, Tokyo (JP)

( * ) Notice: Subject to any disclaimer, the term of this patent is extended or adjusted under 35 U.S.C. 154(b) by 578 days.

(21) Appl. No.: 12/326,029

(22) Filed: Dec. 1, 2008

(65) Prior Publication Data

US 2009/0140941 A1 Jun. 4, 2009

(30) Foreign Application Priority Data

Nov. 30, 2007 (FR) .................................... 07 08392

(51) Int. Cl.
*H04B 7/00* (2006.01)
*H01Q 3/00* (2006.01)

(52) U.S. Cl. ....................................... 342/367; 342/371

(58) Field of Classification Search .................... 342/81, 342/154, 367, 371, 375, 417
See application file for complete search history.

(56) References Cited

U.S. PATENT DOCUMENTS

| | | | |
|---|---|---|---|
| 5,089,825 | A | 2/1992 | Suzuki |
| 5,519,405 | A | 5/1996 | Matsubara et al. |
| 2005/0042999 | A1 | 2/2005 | Rappaport |
| 2005/0250543 | A1 | 11/2005 | Thermond |
| 2006/0152410 | A1 | 7/2006 | Shi |

FOREIGN PATENT DOCUMENTS

| | | | |
|---|---|---|---|
| EP | 1845584 | A1 | 10/2007 |
| GB | 2424544 | A | 9/2006 |

OTHER PUBLICATIONS

European Search Report dated May 19, 2009 in corresponding European Patent Application No. 08170217.7.

*Primary Examiner* — Dao Phan
(74) *Attorney, Agent, or Firm* — Fitzpatrick, Cella, Harper & Scinto

(57) ABSTRACT

Antenna beam angles of one or more directional antennas of a wireless device are updated to communicate with a plurality of other wireless devices. Each one of the antenna beam angles is associated with one of the plurality of other wireless devices. At least one angle correction is determined to update the antenna beam angle associated with at least one first wireless device among the plurality of other wireless devices. The antenna beam angle associated with at least one second wireless device is first updated using the determined at least one angle correction of the antenna beam angle associated with the first wireless device.

12 Claims, 10 Drawing Sheets

410 400

| Device (ID) | 1 | 2 | 3 | 4 | 5 | 6 | 7 | 8 | 9 |
|---|---|---|---|---|---|---|---|---|---|
| Angle (α) | 77,00 | 97,50 | 116,50 | 35,00 | 162,00 | - | 180,00 | 86,00 | 108,50 |

420

800a

| Device (ID) | 1 | 2 | 3 | 4 | 5 | 6 | 7 | 8 | 9 |
|---|---|---|---|---|---|---|---|---|---|
| Angle ($\alpha_0$) | 77,00 | 97,50 | 116,50 | 35,00 | 162,00 | - | 180,00 | 86,00 | 108,50 |

820a

Fig. 8a

800b

| Device (ID) | 1 | 2 | 3 | 4 | 5 | 6 | 7 | 8 | 9 |
|---|---|---|---|---|---|---|---|---|---|
| Angle ($\alpha_1$) | 51,00 | 71,67 | 90,79 | 35,00 | 140,00 | - | 155,25 | 59,17 | 82,38 |

820b

Fig. 8b

800c

| Device (ID) | 1 | 2 | 3 | 4 | 5 | 6 | 7 | 8 | 9 |
|---|---|---|---|---|---|---|---|---|---|
| Angle ($\alpha_2$) | 52,00 | 72,50 | 91,00 | 13,00 | 134,50 | - | 149,00 | 62,00 | 83,00 |

820c

Fig. 8c

Prior Art

METHOD, APPARATUS AND COMPUTER PROGRAM FOR UPDATING ANTENNA BEAM ANGLES OF A DIRECTIONAL ANTENNA OF WIRELESS DEVICE

BACKGROUND OF THE INVENTION

1. Technical Field of the Invention

The present invention relates to radio communication systems. The present invention is particularly applicable to radio communication systems employing electronically controlled antenna arrays.

2. Description of the Background Art

Wireless systems using electromagnetic signals with a wavelength of the order of a few millimeters, typically in the 60 Ghz band, are well suited for transporting large amounts of data over short distances. A wireless system of this kind can achieve very high bit rates, e.g. above one gigabit per second, and thus makes it suitable for connecting several audio and video devices in a home network for example.

Signals with these characteristics, hereinafter referred to as millimeter band signals, have different propagation characteristics from lower frequency signals. In the millimeter band, most of the useful energy that reaches receive antenna comes from the energy radiated in line of sight by the transmitting antenna. Thus, the reception rate beyond obstacles that can be found in a domestic environment like walls, furniture, human beings, etc. is very low. This makes the use of adjustable directional antennas in such wireless systems very efficient as they are capable of adapting the antenna gain characteristics based on the direction of interest.

In an emitting mode, an electronically adjustable directional antenna allow control of how the electromagnetic beam spreads out as it get farther from its point of origin. It is thus possible to steer the beam to the direction of a receiver for example. In receiving mode, an electronically adjustable directional antenna is able to adapt the antenna gain based on the direction of arrival of a received signal. In either mode, it is thus a requirement to know the direction of transmission or the direction of arrival of a signal to adapt the antenna gain characteristics accordingly.

In wireless systems comprising wireless devices having fixed positions, it's enough to have predefined antenna settings adapted for each direction corresponding to a possible pair of communicating wireless devices. This technique allows fast switching of a communication from one wireless device to another, compared to automatic determination of direction of arrival of the radio wave each time an emitter changes its position for example.

FIG. 1 depicts for illustrative purposes a home wireless audio system 100 comprising fixed wireless devices. This system comprises a plurality of wireless devices 110-190 consisting of a plurality of wireless active speakers (WAS) 110-180 and a wireless surround controller (WSC) 190. A WAS is a wireless device that is embedded in a speaker, and a WSC is a wireless device that possesses an interface to retrieve digital audio content from outside the wireless network and to distribute it to the wireless active speakers.

Access to the radio channel of the wireless audio system 100 is managed using a TDMA ("Time Division Multiple Access") protocol. This protocol consists in dividing time into cycles (frames) and sharing the radio channel over time between the wireless devices by assigning one timeslot per cycle to each source device to send its data. The source devices transmit data in rapid succession which requires fast switching of antenna beam direction at either emitting side, receiving side or both.

Predefining antenna settings can be performed during an initialization phase before any communication in the wireless system actually starts. This initialization can be performed using the following algorithm. Sequentially, every wireless device transmits a radio wave during a predetermined period of time using a wide beam radiation pattern or an omnidirectional pattern. During that predetermined period of time, every other wireless device performs a scan of the full available range of angles using a narrow beam and measures the received signal strength. Antenna settings corresponding to the angle providing the maximum signal strength are saved along with the associated angle.

While running the above algorithm before any communication over the wireless network actually starts may be acceptable, updating the settings for a given antenna during system operation may cause serious quality degradation or interruption of service.

In a home wireless audio system as depicted in FIG. 1 it is likely that a wireless device, e.g. a speaker, will be moved, either by accident or deliberately, because wireless devices are usually within reach of home occupants and speakers are likely to be knocked or otherwise disturbed.

It is thus desirable to provide a method to update antenna angles as quickly as possible when the system is operating in order to reduce service interruption.

SUMMARY OF THE INVENTION

The present invention has been made to address the drawbacks of prior art method as described above. Particularly, the present invention has been made for providing a method for updating angles of a directional antenna.

According to a first aspect of the present invention, there is provided a method for updating antenna beam angles of one or more directional antennas of a wireless device to communicate with a plurality of other wireless devices, each one of the antenna beam angles being associated with one of the plurality of other wireless devices. The method comprises the steps of:

determining at least one angle correction to update the antenna beam angle associated with at least one first wireless device among the plurality of other wireless devices; and first updating of the antenna beam angle associated with at least one second wireless device using the determined at least one angle correction of the antenna beam angle associated with the first wireless device.

Correlatively, the present invention relates to an apparatus for updating antenna beam angles of one or more directional antennas of a wireless device to communicate with a plurality of other wireless devices, each one of the antenna beam angles being associated with one of the plurality of other wireless devices. The apparatus comprising:

determination means for determining at least one angle correction to update antenna beam angle associated with at least one first wireless device among the plurality of other wireless devices; and first updating means for updating the antenna beam angle associated with at least one second wireless device using the determined at least one angle correction of the antenna beam angle associated with the first wireless device.

The angle correction from the first wireless device is used as an approximation of the antenna beam angle associated with the second wireless device. The use of such an approximation helps quickly realign the antenna beam with the direction of arrival of the radio waves because it is likely to be a good approximation to the correct angle.

Advantageously, the method further comprises a step of second updating of the antenna beam angle associated with the at least one second wireless device using a progressive scan starting from the first updated antenna beam angle associated with said at least one second wireless device.

The progressive scanning allows to quickly converge towards the optimal angle orientation because it is very likely that said optimal angle orientation is to be very close from the first updated antenna beam angle.

According to a particular mode of the invention, the plurality of angle corrections are determined at the determining step for a plurality of first wireless devices.

According to a first mode of implementation, the step of first updating the antenna beam angle associated with at least one second wireless device is performed using the most recently determined angle correction among the plurality of determined angle corrections.

Thus, if several displacements have occurred, the latest determined angle correction will provide the best approximation to update the antenna beam angle associated to the second wireless device.

According to a second mode of implementation, the step of first updating the antenna beam angle associated with at least one second wireless device is performed using an averaged angle correction calculated from the plurality of determined angle corrections.

Indeed, the angle corrections determined for the plurality of first wireless devices vary according to the relative position of the first wireless devices with respect to the wireless device. Averaging provides thus a good approximation to update the antenna beam angle associated to the second wireless device.

According to a particular mode of the invention, the determining step of at least one angle correction comprises the steps of:

determining at least one updated antenna beam angle associated with said at least one first wireless device using a progressive scan starting from a predetermined value; and calculating said at least one angle correction by subtracting said at least one updated antenna beam angle from an original antenna beam angle.

It is thus advantageous to use the progressive scan even for determining the angle correction for the at least first wireless device. The progressive scan uses a predetermined value as a starting point; preferably equal to any previously determined angle value associated to that at least first wireless device.

The present invention also relates to a program carried by a carrier medium which, when executed by a computer or a processor in a device, causes the device to carry out a method for updating antenna beam angles such as briefly described above.

According to a second aspect of the present invention, there is provided a method for updating antenna beam angle of a directional antenna of a wireless device, the method comprising the steps of:

determining a reference angle; and scanning progressively from the determined reference angle until receiving an acceptable radio wave strength.

The progressive scan allows to quickly converge towards the optimal angle orientation starting from the reference angle.

Preferably, the reference angle is chosen to be the angle of the antenna beam prior the scanning step is executed.

Alternatively, the reference angle is chosen to be the mean angle value of the opening angle of the directional antenna of the wireless device.

According to a particular mode of implementation, the progressive scan starting from the reference angle is performed alternatively around the reference angle.

Other features and advantages will appear in the following description, which is given solely by way of non-limiting example and made with reference to the accompanying drawings.

BRIEF DESCRIPTION OF THE DRAWINGS

FIGS. 8*a*, 8*b* and 8*c* show numerical examples of the values of the antenna beam angles prior the updating, after performing a first update and after performing a second update.

DETAILED DESCRIPTION OF THE EMBODIMENTS

In the following, a detailed description will be given of embodiments of the present invention with reference to the accompanying drawings.

Figure 2A:
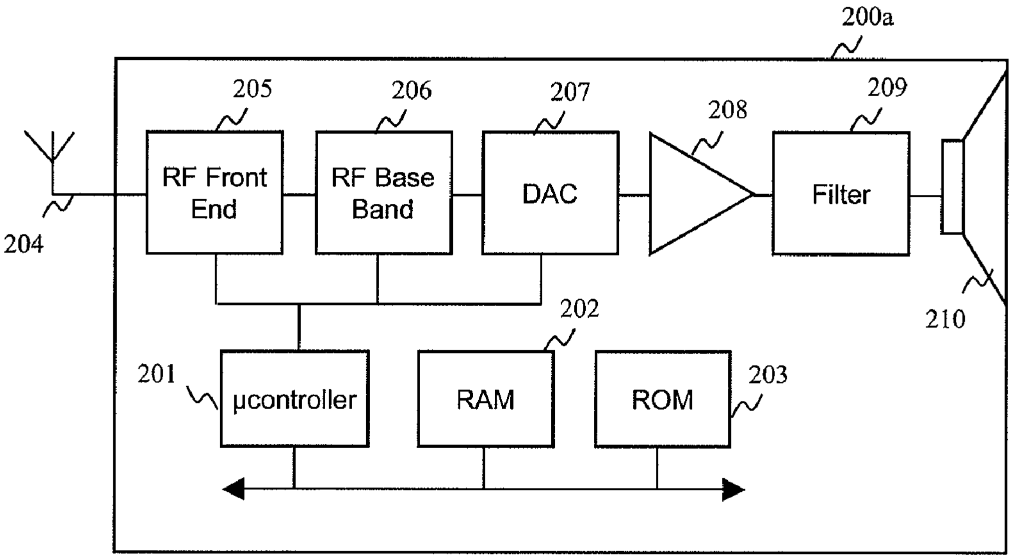
FIGS. 2*a* and 2*b* illustrate a schematic configuration of communication devices adapted to embody the invention.
Figure 2B:
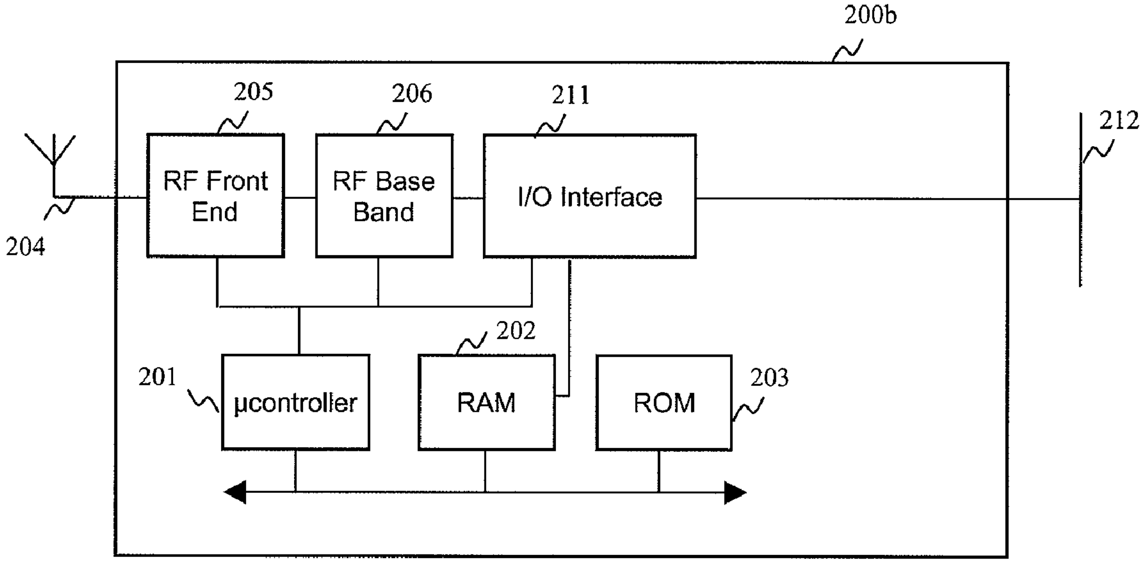

FIGS. 2*a* and 2*b* illustrate a schematic configuration of communication devices adapted to embody the invention. Device 200*a* may represent any device of the plurality of wireless active speaker (WAS) devices 110-180 of the wireless audio system 100. Device 200*b* represents wireless surround controller (WSC) 190. Same references are used for common units between the communication devices 200*a* and 200*b*.

Reference numeral 202 is a RAM which functions as a main memory, a work area, etc., of CPU 201, and the memory capacity thereof can be expanded by an optional RAM connected to an expansion port (not illustrated). CPU 201 is capable of executing instructions on powering up of the communicating apparatus from program ROM 203. After the powering up, CPU 201 is capable of executing instructions from RAM 202 relating to a computer program after those instructions have been loaded from the program ROM 203 or an external memory (not illustrated). Such computer program, when executed by the CPU 201, causes part or all of the steps of the flowcharts shown in FIGS. 6, 7 and 11 to be performed.

Reference numeral 205 represents a front end configured to adapt the signal at the output of the base band unit 206 before its emission through the antenna 204 (frequency translation and power amplification for example), and adapted to receive a signal from the antenna 204 to be delivered to the base band unit 206. The base band unit 206 modulates/demodulates digital data exchanged with the front-end unit 205.

Antenna 204 is typically an array antenna that can be electronically controlled by code instructions executed by CPU 201 to act as a beamformer.

Wireless active speaker 200*a* further contains a digital-to-analog converter 207, an amplifier 208, a filter 209 and a speaker 210.

Communication device 200*b* represents a wireless surround controller. The wireless surround controller is similar in structure to the wireless active speaker 200*a*, but instead of the digital-to-analog converter, amplifier, filter and speaker contains an input/output interface with an external network 212 to retrieve digital data to be distributed to the wireless devices 110-180 of the wireless audio system 100.

Figure 3A:
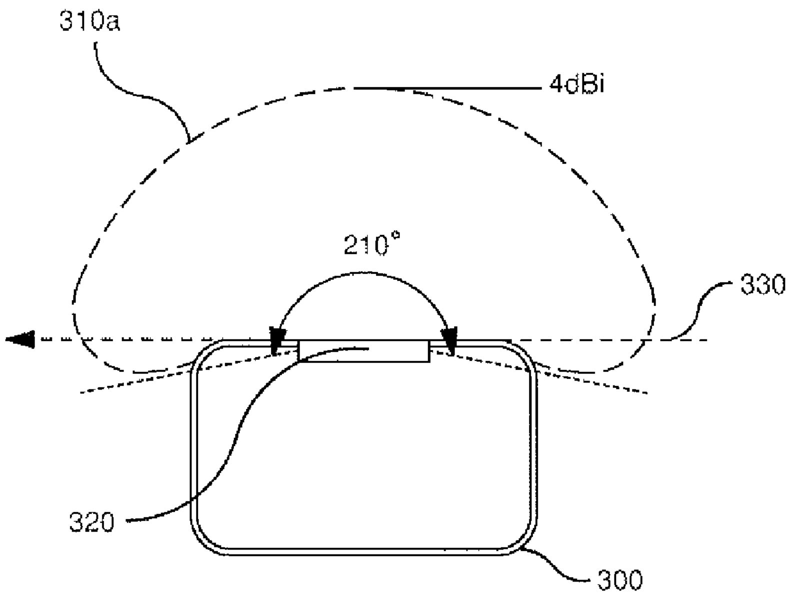
FIGS. 3*a* and 3*b* depict two different antenna radiation patterns of an electronically adjustable directional antenna.
Figure 3B:
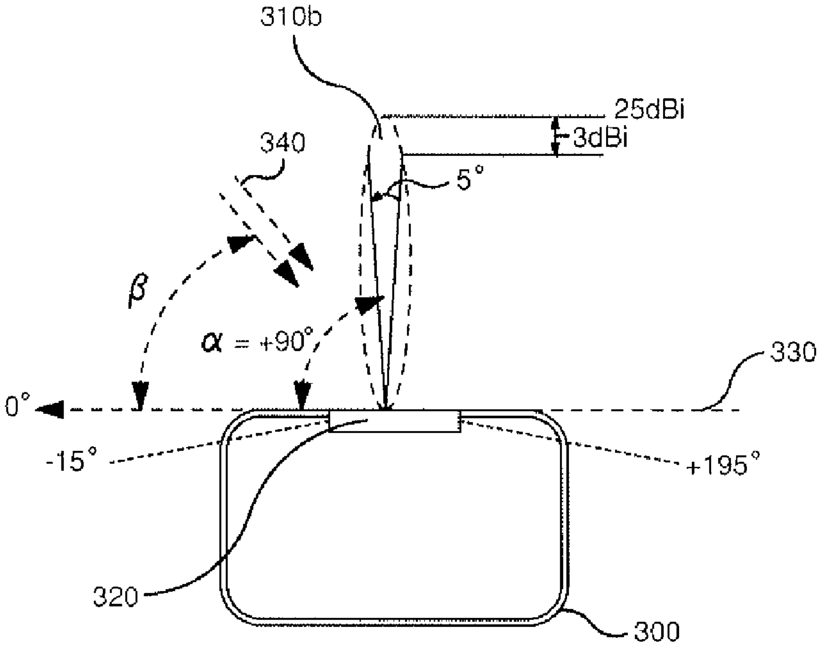

FIGS. 3*a* and 3*b* depict two different antenna radiation patterns 310*a* and 310*b*. The two radiation patterns are generated by an electronically adjustable directional antenna array (320). An antenna array consists of a set of antenna elements arranged in certain geometry. The signals collected by individual elements are combined in a manner to control the orientation of the formed beam. The technique of beamforming is known in the art and will not be detailed here. A reference axis (330) is chosen to measure the beam orientation angle.

FIG. 3*a* depicts an antenna having a single wide main beam 310*a* (angle equals 210°). The main beam gain is thus relatively small, approximately 4 dBi (a "dBi" represents a measure of antenna gain relative to an isotropic antenna). This type of antenna is typically used at the emitting side in order to make possible the simultaneous reception of a radio wave by a plurality of receivers.

FIG. 3*b* depicts an antenna having a single narrow main beam 310*b* (angle equals 5°, measured at −3 dBi from the maximum). The main beam gain is relatively high, for example 25 dBi. The antenna has thus different gain characteristics at different reception angles. A maximum gain is obtained when the direction of arrival (β) of a radio wave (340) is equal to the angle of the main beam (α), i.e. arrives at an angle of 90° in the particular example of FIG. 3*b*. When getting farther from the angle of 90°, in either direction, the gain decreases rapidly due to the narrow width of the beam. This type of antenna is typically used at the receiving side as it can be directed to one emitting point at a time.

Each wireless device 110-190 of the wireless audio system 100 is capable of forming a radiation pattern similar to pattern 310*a* or to pattern 310*b* depending on whether it acts as an emitter or a receiver. Furthermore each wireless device 110-190 is capable of switching from one radiation pattern to another and controlling the direction of the beam 310*b* to point to the emitting device of the moment.

Wireless devices 110-190 store, in their respective ROM memory 203 for example, the antenna angles for use to communicate with any other wireless device. These angles are for example determined during an initialization phase of the communication wireless audio system 100, either automatically or inputted by a user.

Figures 4, 5:
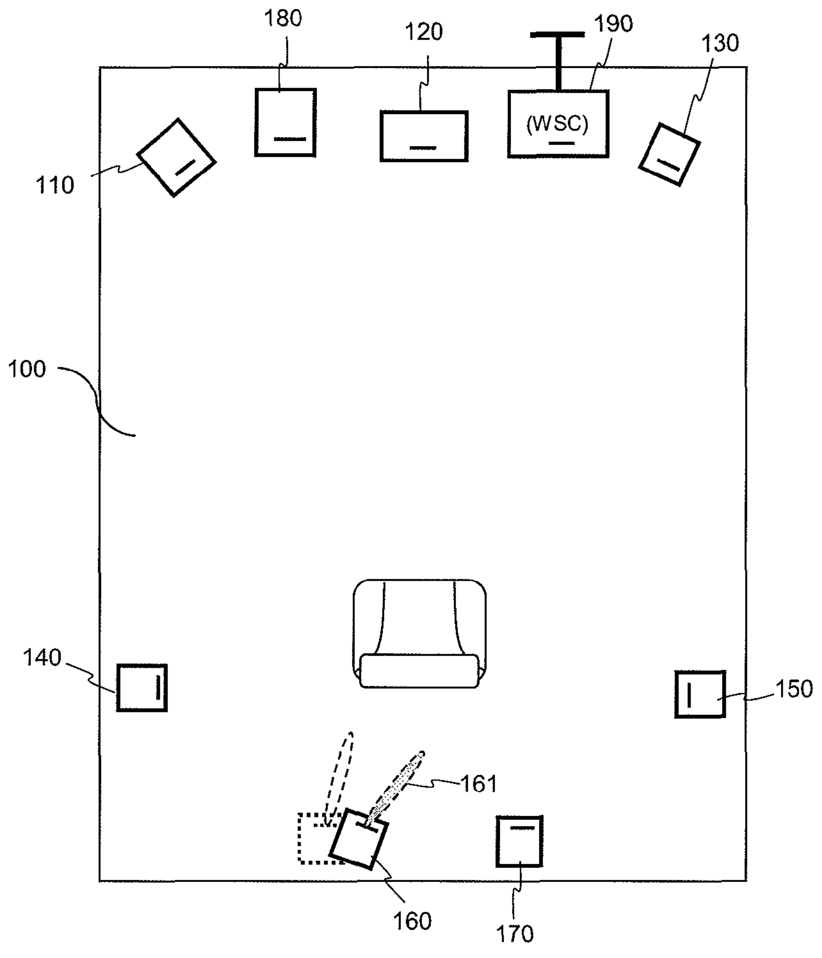
FIG. 4 shows an example of an angle table stored in memory of a wireless device.
FIG. 5 depicts a home wireless audio system showing a moved wireless device.

FIG. 4 shows an example of an angle table 400 stored in memory 203 of wireless device 160. The table 400 contains two rows 410 and 420 and as many columns as the number of wireless devices the wireless device 160 is able to communicate with.

First row 410 contains device identifiers ID#1-ID#9 which are assumed to be assigned respectively to wireless devices with reference numerals 110 to 190 in the wireless audio system 100 (identifiers ID#1 to ID#8 correspond thus to wireless active speakers, whereas identifier ID#9 corresponds to a wireless surround controller 190).

Second row 420 contains orientation angles (α) the antenna main beam of wireless device 160 should have in order to communicate with the other wireless devices. Each column associates an angle with a wireless device identifier. For example, in order to receive the maximum signal strength while wireless device 170 is emitting (ID#7), wireless device 160 sets its reception beam at an angle of α=180°.

In the following we assume wireless device 160 has moved and thus data angles stored in table 400 at this device are to be updated according to the present invention. Wireless device 160 is chosen as an example only to explain the invention. All the implementation details disclosed herein can be applied to any other wireless device of the wireless system.

Figure 1:
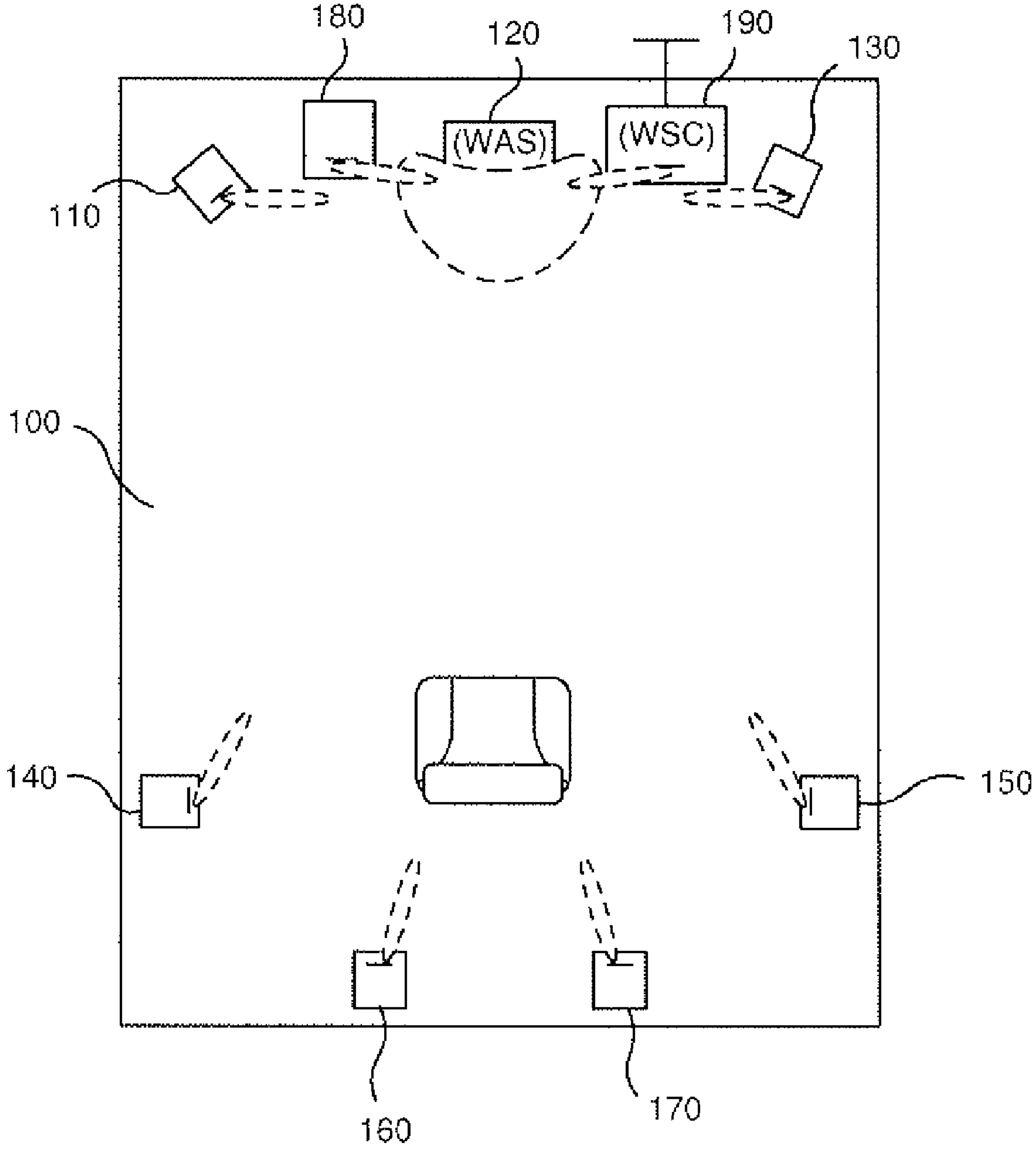
FIG. 1 depicts a home wireless audio system that may embody the present invention.

FIG. 5 depicts the home wireless audio system 100 of FIG. 1 (same reference numerals are used for wireless devices) in which wireless device 160 has moved. The reference (330) of the antenna beam 161 has thus changed and all the angles of table 400 need to be updated accordingly.

Figure 6:
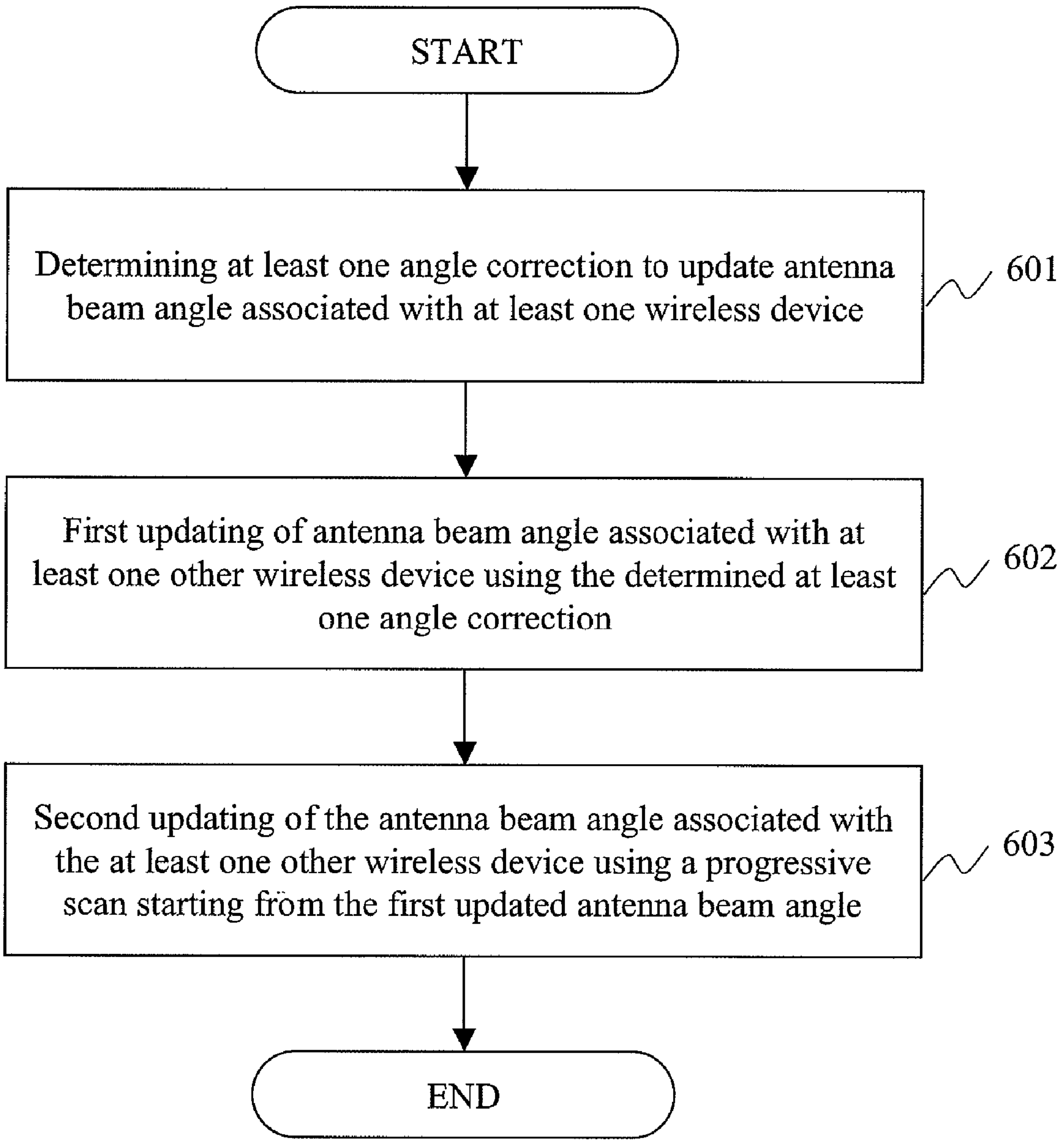
FIG. 6 depicts a flowchart for updating the antenna beam orientation angles of a wireless device according to a first embodiment of the present invention.

FIG. 6 depicts a flowchart for updating the antenna beam orientation angles (420) of wireless device 160 according to a first embodiment of the present invention.

At step 601, an angle correction to be applied to the antenna beam angle associated with a first wireless device is determined, the first wireless device being one of the wireless devices 110-150 and 170-190 (all wireless devices excluding 160). The angle correction represents a value that shall be subtracted from a previously determined angle value of the first wireless device, for example as stored in table 400, to update it. The correction angle may be determined by subtracting the value obtained by performing a full scan or a progressive scan from the available (not yet updated) angle value stored in table 400.

At step 602, a first updating of the antenna beam angle associated with at least a second wireless device is performed using the angle correction determined for the first wireless device, the second wireless device being one of the wireless devices 110-150 and 170-190 but different from the first wireless device. The first updating consists for example in subtracting the angle correction determined in step 601 from the angle value of the second wireless device stored in table 400.

In step 601 the angle correction from the first wireless device is used as an approximation of the antenna beam angle associated with the second wireless device. The advantage of having this approximation is that it helps quickly realign the antenna beam with the direction of arrival of the radio waves because it is likely to be a good approximation to the correct angle, even though it may not correspond to the optimal orientation. In fact, the width of the antenna beam may still allow to receive correctly the radio wave signal.

At step 603, a second updating of the antenna beam angle associated with at least a second wireless device is performed using a progressive scan starting from the first updated antenna beam angle of said at least second wireless device. The first updated antenna beam angle is thus considered as a reference value, which serves as a starting point for determining the optimal angle orientation. Progressive scanning allows the wireless active speaker 160 to quickly converge towards the optimal angle orientation because it is very likely that said optimal angle orientation is to be very close from the first updated antenna beam angle (reference value).

The steps 601 to 603 may be repeated for further angles in the table corresponding to wireless devices. When updating the antenna beam angles in step 601, it will be the case that there are a plurality of correction values that have previously been determined. In such case, the plurality of correction values may be combined to form a single correction value, for example by averaging.

The displacement of the wireless device 160 may be broken up into a rotation and a translation. The first updating step 601 allows for compensation for angle change due to the rotation, so if the displacement is a pure rotation the first updating provides already a correct update of the angle. If the displacement is a combination of a rotation and a translation, the first updating is still a good approximation of the new antenna beam angle; the second updating allows to refine the update and to compensate for the angle change due to the translation.

Figure 7:
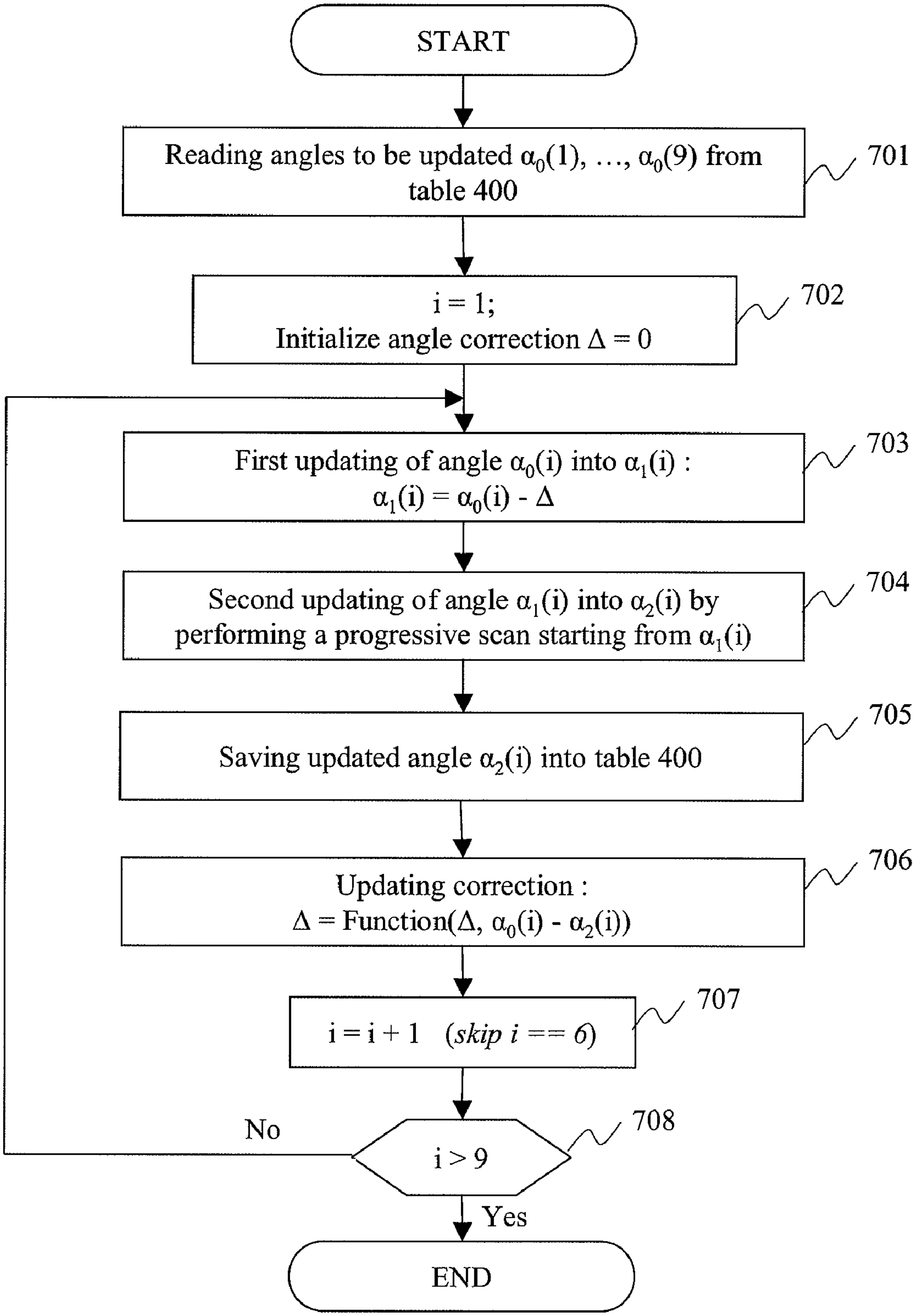
FIG. 7 represents an implementation example of the updating method according to the first embodiment of the invention as depicted by FIG. 6.

FIG. 7 represents an implementation example of the updating method according to the first embodiment of the invention as depicted by FIG. 6.

At step 701, antenna beam angles associated with the different wireless devices are read from the angle table 400 in order to be updated. The updating can be triggered either on a regular basis or by means of a displacement detection sensor located with the wireless device 160 for example. The triggering can also be performed by monitoring the signal strength of the received radio signal. If the signal strength decreases below a certain threshold or the signal is lost for a predetermined period of time, the method according the flowchart of FIG. 7 is executed.

It is assumed that a TDMA system is used and that the wireless devices ID#1, ID#2, . . . , ID#9 transmit in sequence, each one during its assigned timeslot.

At step 702, variables i and Δ designating respectively the wireless device identifiers and the angle correction are initialized. The angle correction is initialized to zero. The variable i is initialized to the identifier of the wireless device to which is associated the first angle to be updated. In the implementation example of FIG. 7 i is initialized to 1, but preferably the first angle to be updated is the one associated to the wireless device scheduled to transmit right after the updating process is triggered. This allows shortening the total update time.

At step 703, a first updating of antenna beam angle associated to the current wireless device ID#i ($\alpha_1(i)$) is performed using the correction angle previously calculated. Obviously, for the wireless device ID#1 no angle correction is available and thus the associated antenna beam angle is kept unchanged.

At step 704, a second updating of antenna beam angle associated to the current wireless device i ($\alpha_2(i)$) is performed using a progressive scan starting from, and around, the first updated value of the antenna beam angle ($\alpha_1(i)$). The first updated value is considered as a reference angle value for the progressive scan. For example, considering a step of 1°, the following sequence of angles is tested in order until the optimal angle is reached:

$$\alpha_2=\alpha_1+1;\alpha_1-1;\alpha_1+2;\alpha_1-2;\alpha_1+3;\alpha_1-3; \ldots$$

Alternatively, the progressive scan is performed at both sides of the first updated value, i.e. $\alpha_1$−step and $\alpha_1$+step, during an initial phase only. When an increase of the signal strength of the received radio signal in a given side (or a decrease of signal strength in another given side) is detected, the progressive scan continues only at that given side. This allows speeding up the updating process as not promising angle values are not explored.

It should be noted that the second updating performed at step 704 is performed while the associated wireless device is emitting during its assigned timeslot. This is different from the first updating which is internally calculated. This speeds up the whole updating process and makes it converge within a timeslot period of time.

To illustrate the algorithm of FIG. 7 with numerical examples, FIGS. 8*a*, 8*b* and 8*c* depict three tables 800*a*, 800*b* and 800*c* representing the memory storage for, respectively, the angle values to be updated (same content as table 400), first updated angle values ($\alpha_1$) and second updated angle values ($\alpha_2$).

At step 705, the updated angle $\alpha_2$ (820*c*) is saved in the table 800*c* in the column associated to ID#i. Even though it is not a requirement, first updated angle $\alpha_1$ is also saved in table 800*b* for illustrative purposes.

At step 706, the angle correction Δ is updated in order to be used during the next iteration. Different alternate solutions exist for updating this angle correction. One solution is to keep only the last angle correction $\alpha_0(i)-\alpha_2(i)$ to be used for the next iteration. Another solution is to average the so far calculated angle corrections.

At step 707, variable i is incremented in order to update the angles associated with the remaining wireless devices, expect for wireless device ID#6 which is the one implementing the update.

FIGS. 8*a*, 8*b* and 8*c* show numerical examples of the values of the antenna beam angles prior to the updating (820*a* in FIG. 8*a*), after performing the first updating step 703 (820*b* in FIG. 8*b*) and finally after performing the second updating step 704 (820*c* in FIG. 8*c*), as indicated above.

Figure 9:
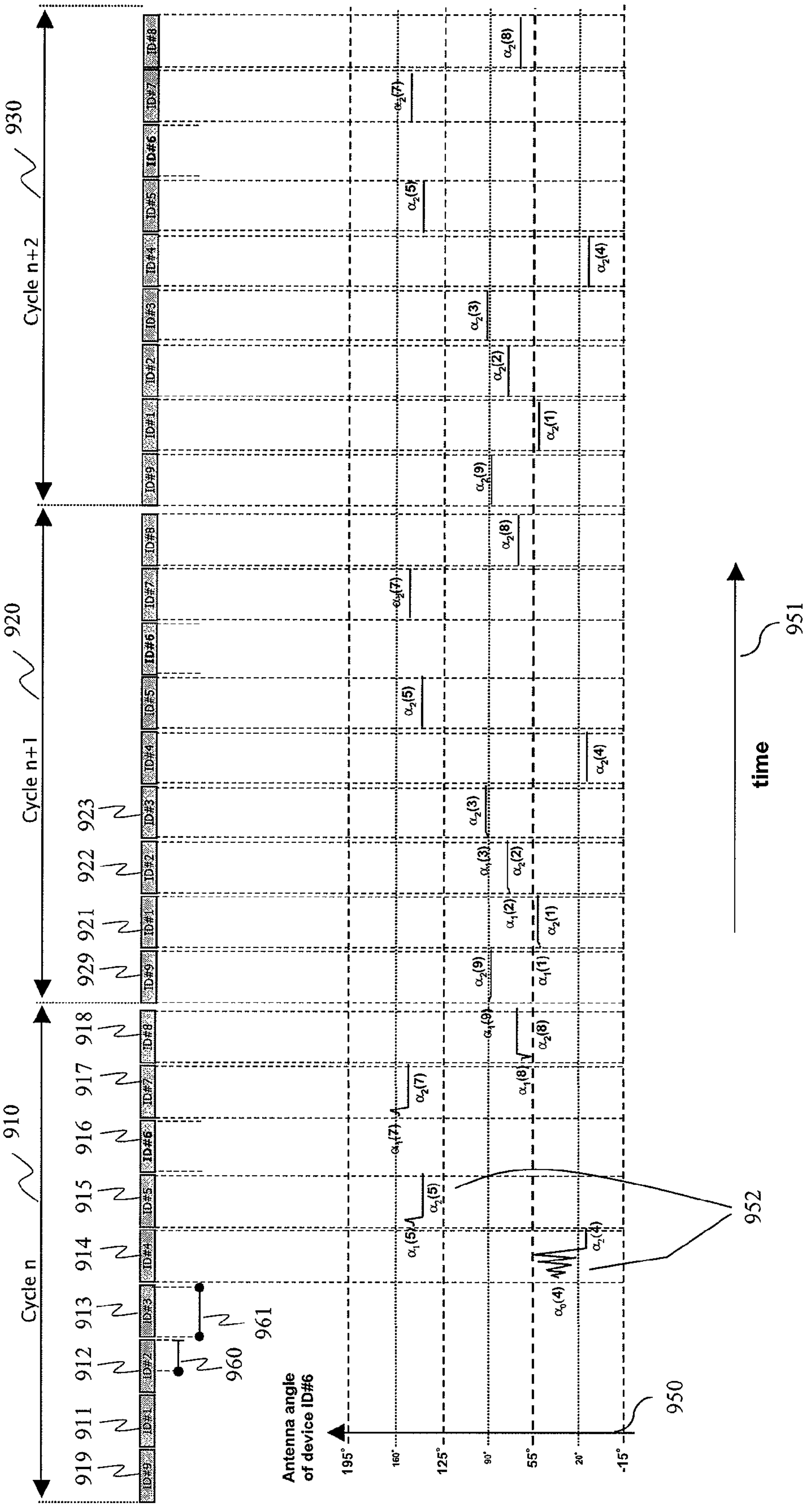
FIG. 9 shows a temporal representation of the updating process as described in FIG. 7 considering a TDMA based wireless system.

FIG. 9 shows a temporal representation of the updating process as described in FIG. 7 executed in a TDMA based wireless system.

Time is divided into cycles n (910), n+1 (920), n+2 (930), etc., and one timeslot (919, 911, 912, etc.) is assigned per cycle to every wireless device to send its data. When a wireless device is transmitting during a timeslot, all other wireless devices may listen to that transmitting wireless device, either to receive data or for setting parameters like the determination of the antenna beam reception angle (α). Timeslots are assumed to be assigned in sequence (9, 1, 2, . . . , 8) within a cycle, so wireless device 190 (WSC) starts transmitting first in a cycle, followed by wireless device 110, then 120, etc. Duration of a cycle is typically equal to 2 ms and that of a timeslot is equal to 200 μs.

Reference numerals 950 and 951 show respectively an angle axis and a time axis. These axes allow to represent the evolution in time (952) of the antenna beam angle (α) of wireless device 160. The evolution in time shown in a given timeslot (919, 911, 912, etc.) is associated to the wireless device transmitting during that timeslot.

The variation interval of the antenna beam angle of wireless device 160 is assumed to be [−15°, +195°] which represents an opening of 210°. The scanning speed is 70° per timeslot (200 μs) using a step of 1° (i.e. 1° per 2.86 μs). Thus, a full scan of the whole antenna opening can be performed in 600 μs which is equivalent to 3 timeslots.

It is assumed that wireless device 160 (ID#6) is displaced at timeslot 912 while wireless device 120 (ID#2) is transmitting. Consequently, signal reception is lost by wireless node 160 and no more data is received from wireless device 120 for the remaining duration of the timeslot (960).

In order for the wireless device 160 to confirm that the signal loss is due to device displacement (and in case no displacement detection sensor is implemented), it is possible for example to continue listening in the following timeslot (913), and checking whether a signal is still absent. This is performed by reading the angle associated with wireless device 130 (α(3)) from table 800*a*, setting the orientation of the antenna beam to that angle and detecting signal reception during a timeslot duration (961).

After confirming that the wireless device 160 has moved, updating process starts from timeslot 914. The angle associated with wireless device 140 ($\alpha(4)=35°$) is read from table 800*a*, this value is considered as not up-to-date, thus $\alpha_0(4)=\alpha(4)$. A progressive scan is performed starting from $\alpha_0(4)$ (no prior correction information available yet) until obtaining the new angle value associated with wireless device 140 ($\alpha_2(4)=13°$). It should be noted that the updated angle value is obtained during less than a timeslot (approximately (35−13)×2 angles tested, which represents roughly 126 μs<200 μs). The new angle value associated with wireless device 140 is then saved in table 800*c*. The applied correction (35−13=22°) is recorded either in table 800*c* in an additional row (not represented) or separately in memory 202.

For the following timeslot 915, the angle associated with wireless device 150 ($\alpha_0(5)=162°$) is read from table 800*a*, then firstly updated (step 703) by subtracting the last recorded correction (associated with wireless device 140) which gives $\alpha_1(5)=140°$ (stored in table 800*b*), and finally, secondly updated (step 704) using a progressive scan to reach the final value $\alpha_2(5)=134.5°$ (stored in 800*c*).

The following timeslot is assigned to wireless device 160 to transmit data. Since the emitting is performed using a wide main beam (310*a*), the displacement of wireless device 160 does not significantly effect the reception of the other wireless devices. No angle update is performed during timeslot 916 because only wireless device 160 is emitting.

Steps 703 and 704 are repeated starting from timeslot 917 similarly to timeslot 915 until the antenna beam angles associated with all wireless devices are updated.

It is to be noticed that the updating method according to the invention allows to quickly obtain updated angle values. Indeed, in all cases the update has been completed within less than a timeslot for every antenna beam angle to update. The service interruption (delivery of sound data for example) of wireless device 160 is thus greatly minimized. The total duration of the updating process lasts less than a cycle (from timeslot 914 to timeslot 923).

Figure 10:
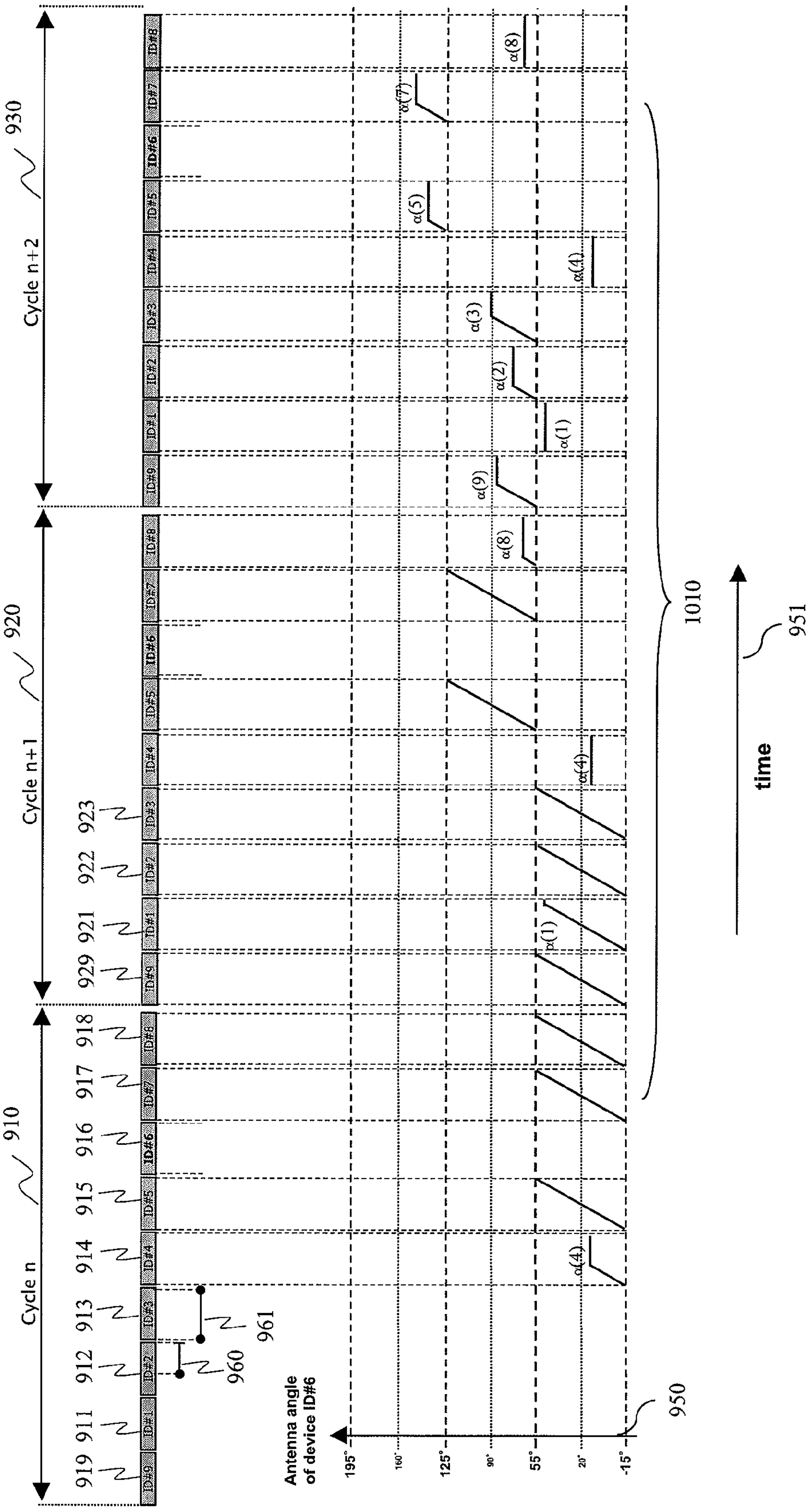
FIG. 10 shows a temporal representation of the updating process according to prior art.

FIG. 10 shows a temporal representation of the updating process according to prior art for comparison purpose with the updating process according to the invention as illustrated by FIG. 9.

Same reference numerals are used as for FIG. 9. According to prior art method, the update of every antenna beam angle in table 800*a* is effected by performing a full scan of the interval [−15°, +195°]. The scanning is stopped when the updated angle value is reached. Because it is possible to scan only one third of the antenna opening (70°) per timeslot, it may happen that several timeslots are necessary to reach the appropriate antenna beam angle. It is important to note here that timeslots are assigned on a cycle basis for a given wireless device, so if for example three timeslots are required for the update (cf. $\alpha(7)$ for wireless device ID#7), the total duration is thus equal to at least two cycles, i.e. 4 ms (1010).

The update method according to the invention clearly outperforms prior art method.

Figure 11:
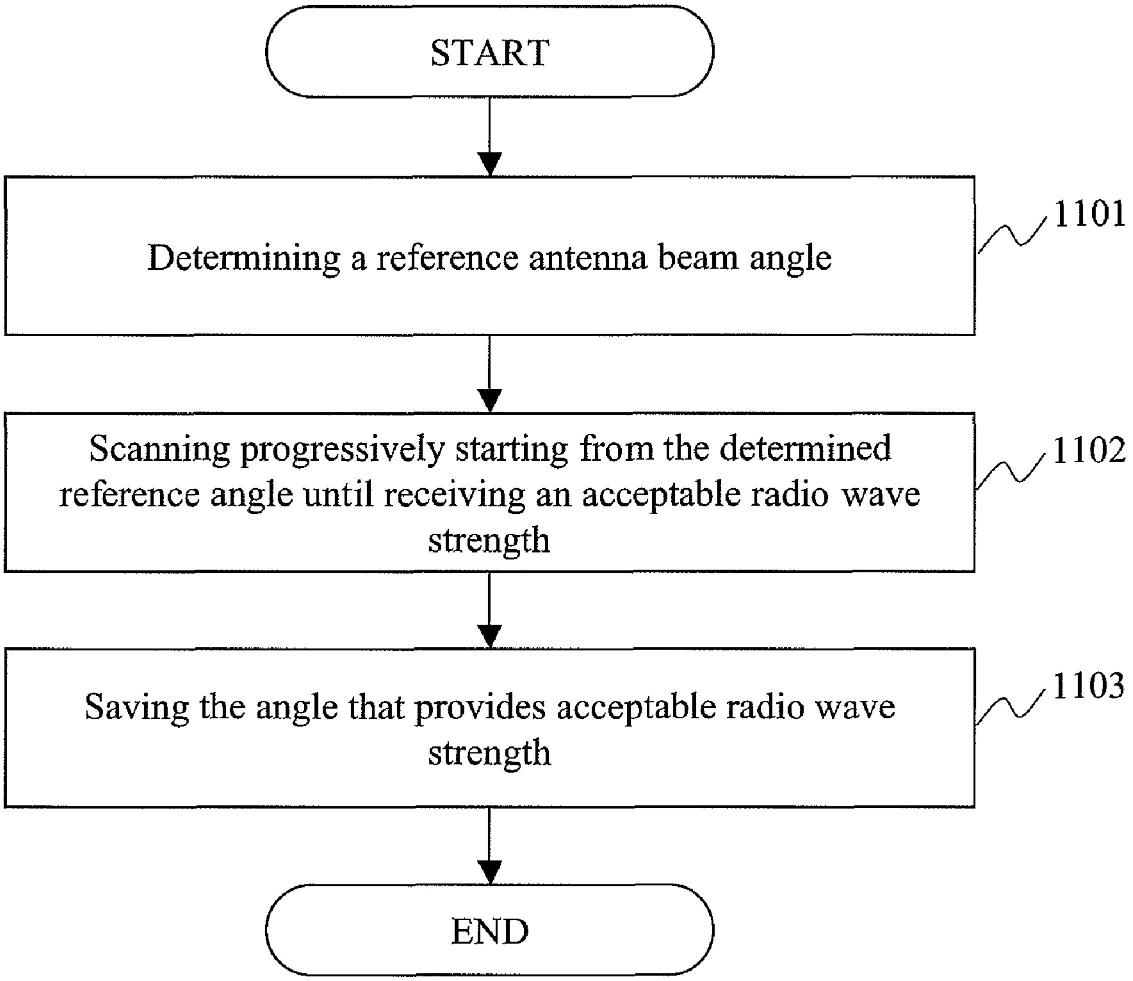
FIG. 11 depicts a flowchart for updating an antenna beam orientation angle of a wireless device according to a second embodiment of the present invention.

FIG. 11 depicts a flowchart for updating one antenna beam orientation angle of wireless device 160 to communicate with another wireless device, according to a second embodiment of the present invention.

At step 1101, a reference antenna beam angle is determined that will serve as a starting point for the progressive antenna scan. This reference antenna beam angle is typically equal to the last non updated antenna beam angle as stored in row 820*a* of table 800*a* and associated with said another wireless device.

Alternatively, the reference angle may be set to the angle that was most often used in previous settings.

In yet another particular mode of the invention, the reference angle may be set to the mean angle value of the opening angle of the directional antenna of the wireless device. In the example of the antenna of FIG. 3*b*, the opening is from −15 to +195°; and thus the mean angle value corresponds to 90° relatively to the reference axis.

At step 1102, a progressive scan is performed starting from the determined reference angle, until receiving an acceptable radio signal strength. Preferably, the progressive scan is performed around the reference value, alternating from one side to another until detecting an increase in signal strength and then continuing in the side where the strongest signal strength is detected.

At step 1103, the antenna beam angle for which the radio signal strength is above a predetermined threshold is selected and saved in table 820*c*. Alternatively, the angle corresponding to the maximum signal strength detected is selected.

This application claims priority from French application no. 07/08392 filed on 30 Nov. 2007, which is hereby incorporated by reference in its entirety.

The invention claimed is:

1. A method for updating antenna beam angles of one or more directional antennas of a wireless device to communicate with a plurality of other wireless devices, each one of the antenna beam angles being associated with one of the plurality of other wireless devices, said method comprising:

determining at least one angle correction to update the antenna beam angle associated with at least one first wireless device among the plurality of other wireless devices; and first updating of the antenna beam angle associated with at least one second wireless device using the determined at least one angle correction of the antenna beam angle associated with the first wireless device.

2. A method according to claim 1, further comprising further updating of the antenna beam angle associated with the at least one second wireless device using a progressive scan starting from the first updated antenna beam angle associated with said at least one second wireless device.

3. A method according to claim 1, wherein a plurality of angle corrections are determined for a plurality of first wireless devices.

4. A method according to claim 3, wherein updating the antenna beam angle associated with at least one second wireless device is performed using the most recently determined angle correction among the plurality of determined angle corrections.

5. A method according to claim 3, wherein updating the antenna beam angle associated with at least one second wireless device is performed using an averaged angle correction calculated from the plurality of determined angle corrections.

6. A method according to claim 1, wherein determining comprises:

determining at least one updated antenna beam angle associated with said at least one first wireless device using a progressive scan starting from a predetermined value; and calculating said at least one angle correction by subtracting said at least one updated antenna beam angle from an original antenna beam angle.

7. A non-transitory computer-readable storage medium storing a program which, when executed by a computer or a processor in a device, causes the device to carry out a method for updating antenna beam angles of one or more directional antennas of a wireless device to communicate with a plurality of other wireless devices, each one of the antenna beam angles being associated with one of the plurality of other wireless devices, said method comprising:

determining at least one angle correction to update the antenna beam angle associated with at least one first wireless device among the plurality of other wireless devices; and first updating of the antenna beam angle associated with at least one second wireless device using the determined at least one angle correction of the antenna beam angle associated with the first wireless device.

8. An apparatus for updating antenna beam angles of one or more directional antennas of a wireless device to communicate with a plurality of other wireless devices, each one of the antenna beam angles being associated with one of the plurality of other wireless devices, said apparatus comprising:

determination means for determining at least one angle correction to update antenna beam angle associated with at least one first wireless device among the plurality of other wireless devices; and first updating means for updating the antenna beam angle associated with at least one second wireless device using the determined at least one angle correction of the antenna beam angle associated with the first wireless device.

9. An apparatus according to claim 8, further comprising second updating means for updating the antenna beam angle associated with the at least one second wireless device using a progressive scan starting from the first updated antenna beam angle associated with said at least one second wireless device.

10. A wireless communication system comprising at least one apparatus as claimed in claim 8.

11. A method for updating an antenna beam angle of a directional antenna of a wireless device, comprising:

selecting a reference angle of the directional antenna that is the mean of operating angles of the directional antenna of the wireless device; and scanning by repeating the following steps with, after each repetition, an incrementally increased scan angle:

measuring a radio wave strength in a direction to one side of the determined reference angle corresponding to the scan angle; and measuring a radio wave strength in a direction on the other side of the determined reference angle corresponding to the scan angle, wherein the above scanning continues until an acceptable radio wave strength is received.

12. An apparatus for updating antenna beam angles of one or more directional antennas of a wireless device to communicate with a plurality of other wireless devices, each one of the antenna beam angles being associated with one of the plurality of other wireless devices, said apparatus comprising:

a determiner to determine at least one angle correction to update antenna beam angle associated with at least one first wireless device among the plurality of other wireless devices; and an updater to update the antenna beam angle associated with at least one second wireless device using the determined at least one angle correction of the antenna beam angle associated with the first wireless device.

* * * * *